3,163,212
COMBINATION FRACTURING AND SECONDARY
RECOVERY METHOD
George G. Bernard, Crystal Lake, Ill., assignor to The
Pure Oil Company, Chicago, Ill., a corporation of Ohio
No Drawing. Filed June 1, 1960, Ser. No. 33,095
6 Claims. (Cl. 166—9)

This invention pertains to the treatment of water-injection wells. More particularly, this invention pertains to a novel composition to be used as a fracturing fluid. In another aspect, this invention pertains to a method for fracturing an oil-containing subterranean formation in the zone surrounding a water-injection well.

Hydraulic fracturing methods for increasing the permeability of a subterranean formation in the zone surrounding a well which traverses the formation are commonly known. Hydraulic fracturing is used to stimulate the flow of oil to oil-producing wells, and to permit the injection of fluids through input and disposal wells at increased rates. Gelled hydrocarbon fluids are used in the fracturing of oil wells, but hydrocarbon fluids are not well adapted for use in fracturing water-injection wells. The gelled hydrocarbons tend to plug the fractures and formation rock and thus hinder the free passage of water from the water-injection well into the formation. Accordingly, it has been necessary to use gel-breaking techniques and substances to reduce the viscosity of the thickened hydrocarbon after the fracturing step has been completed. It is then further necessary to employ techniques for removing the thin hydrocarbon from the formation rock and fractures. Unfortunately, much of the sand commonly included in the fracturing fluid for the purpose of propping the fractures in the expanded position flows back to the well-bore together with the hydrocarbon fluid during the cleanup operation. This permits the formation to settle and close the fractures.

It has become common practice to hydraulically fracture subterranean formations for the purpose of improving water-production rates, or for increasing the intake capacity of the formation when the wells are being used for the disposal of waste water or for the injection of aqueous fluids in secondary recovery operations. While gelled hydrocarbon fluids have been used as the fracturing medium in water-injection wells, such use has been accompanied with the above-mentioned disadvantages. Now, in accordance with this invention, a superior fracturing fluid for use in water-injection wells is provided.

It is the object of this invention to provide a novel fracturing fluid for use in water-injection wells. It is another object of this invention to provide a fracturing fluid for water-injection wells which is completely removed from the zone of formation surrounding the well by the subsequent injection of water. Yet another object of this invention is to provide an aqueous, gelled, fracturing medium which is automatically broken and dissipated by the injection of water through the fractured well. Another object of this invention is to provide a fracturing technique which prevents the contamination of the formation surrounding a water-injection well with hydrocarbon fluids. Still another object of this invention is to provide a novel water-flooding process which provides minimum resistance to water flow in the zone surrounding the injection well and enhances the hydrocarbon-recovering qualities of the water flood-front.

The fracturing fluids used in the method of this invention comprise an aqueous solution of a water-soluble water-thickener, and preferably include a propping material and a water-loss additive.

An especially preferred, novel fracturing fluid comprises an aqueous solution of a high-molecular-weight polymer of ethylene oxide, the molecular weights of the polymers ranging from about 300,000 to 5,000,000. These polymers are water soluble and have high thickening efficiency in dilute solutions. The quantity of ethylene oxide polymers incorporated in the water which forms the bulk of the fracturing fluid will vary, depending upon the permeability and other characteristics of the formation which is to be fractured. In general, the fracturing fluid should have a viscosity in the range of about 10 to 1,500 centipoises. Since as little as 2% by weight of the high-molecular-weight ethylene oxide polymers will raise the viscosity of water to about 5,000 centipoises, it is evident that very little ethylene oxide need be used. In accordance with this invention, ethylene oxide polymers having molecular weights ranging from about 300,000 to as high as 5,000,000, can be incorporated in the water in amounts ranging from about 0.1 to 1.0% by weight. A 1.0% water solution of ethylene oxide polymers having an average molecular weight of about 1,000,000 will have a viscosity of about 500 centipoises. The fracturing fluid may further contain a water-loss additive. The preferred water-loss additive is sodium alginate, which should be incorporated in the water in the amount of 0.1 to 1.0% by weight. If 0.2% of sodium alginate is added to the above-described 500-centipoise fluid, the water-loss rate of the fluid will be less than 20 cubic centimeters per 30 minutes. The fracturing fluid may further contain sand in the amount of about 1 to 10 pounds of sand per gallon of fluid.

Other water-soluble materials having high thickening efficiency in dilute solution, and having high resistance to biological attack, can be used. The fracturing fluid will further preferably contain a small amount of a water-loss additive, together with a sufficient quantity of sand to effectively prop the produced fractures in the open position. The water-loss additive must be water soluble.

Suitable thickeners include acrylamide polymers, including homopolymers of acrylamide, i.e., polyacrylamide, and water-soluble copolymers of acrylamide with up to 15% by weight of other polymerizable vinyl compounds, such as allyl esters of acrylic acid, methylacrylamide, styrene, vinyl acetate, acrylonitrile, vinyl alkyl ethers, and vinyl chloride. Usually, amounts between 0.1 and 1.5 percent by weight of such compounds will raise the viscosity of water to 10 to 1,000 centipoises. Viscosities vary depending upon the presence or absence of other additives and upon temperature. Other thickeners include sodium polyacrylate, which in 3% aqueous solution has a viscosity of about 400 centipoises, and polymeric tertiary amines and quaternary salts, which in 2% solutions produce viscosities of about 1,000 centipoises.

Other superior thickeners such as alkali metal, ammonium, and substituted-ammonium salts of a substituted beta-aminopropionic acid in which a fatty radical is a substituent replacing an amino-hydrogen, such as sodium lauryl beta-aminopropionate, and triethanol-amine lauryl beta-aminopropionate, as well as materials such as the condensation products of coco-fatty acids with diethanolamine, may be used and have the advantage of being highly surface-active. Concentrations of upward of 10% by weight should be employed to produced viscosities of about 100 centipoises or higher. The surface-active qualities of these compounds serve to increase oil recoveries in the waterflood following fracturing.

Suitable water-loss additives include carboxymethyl cellulose and the following gums: arabic, tragacanth, karaya, locust bean, Egyptian, jungle talah, and ghatti. Locust bean gum, gum karaya, and carboxymethyl cellulose may also serve as thickening agents, if added in larger quantities, such as about 1% by weight.

The fracturing fluids of this invention possess several advantages with respect to the conventional fracturing fluids of the prior art. First of all, all of the materials except the sand are water soluble, so that the materials themselves will not obstruct the flow of water through the formation. The water-injection step which follows the fracturing of the formation places sufficient water in the zone surrounding the injection well to dilute the fracturing fluid and thin the gel. The continuing injection of water further dilutes the fluid and drives it from the zone surrounding the injection well. Thus this critical zone of pressure drop is flushed clean of viscous, fracturing fluid. Since the flow of fluid is from the direction from the well towards the formation, the propping sand is urged deeper into the fractures and is not washed back towards the well bore. The usual well-cleanup step is completely eliminated, and the need for gel-breaking agents or techniques is completely avoided.

The technique of this invention provides yet another important advantage in secondary-recovery water-flood operations. The fracturing fluid dissolves in the injected, aqueous, water-flooding medium and is swept from the zone surrounding the injection well. The viscosity of the leading edge of the flood front is thereby increased by the presence of the thickening agent, and a more favorable mobility ratio is obtained between the petroleum in the reservoir and the leading edge of the floodfront. This more favorable mobility ratio is obtained without encountering the difficulties usually presented by the injection of water of increased viscosity through the critical pressure-drop zone surrounding a well bore. This is because the viscosity-increasing agent is automatically placed in the formation in the fracturing step. If the thickener is also surface active, an added advantage is obtained in the reduction in interfacial tension at the floodfront.

As a specific example of the method of this invention, it is desired to conduct a secondary-recovery operation using a water-injection well which is known to be capable of accepting water at a rate of 50 barrels per day at an injection pressure of 300 p.s.i.g. In accordance with this invention, a fracturing fluid consisting of 5,000 pounds of sand in 2,000 gallons of water, which has been thickened by adding 1% by weight of ethylene oxide polymers having an average molecular weight of about 1,000,000, and to which 0.2% by weight of sodium alginate has been added to reduce the water loss of the fluid, is pumped into the well at a rate of 1.5 barrels per minute. During this pumping period the injection pressure increases from an initial level of 300 p.s.i.g. to about 3,000 p.s.i.g., and then decreases rapidly to about 1,500 p.s.i.g., thereby indicating the occurrence of fracturing. After the fracturing step has been completed, water is injected at a rate of 1.5 barrels per minute, using the fracturing pressure equipment, to dissolve the highly viscous fracturing fluid from the well face and fractures. When 500 barrels of flushing water have been injected, normal water injection is resumed at a pressure of 300 p.s.i.g. The new intake capacity of the well is found to be about 200 barrels per day. Petroleum oil is recovered from output wells in a conventional manner.

The embodiments of the invention in which an exclusive property or privilege is claimed are defined as follows:

1. In the production of oil from subterranean reservoirs by the injection of an aqueous flooding medium through an input well, and the recovery of oil through an output well, the improvement comprising the steps of pumping an aqueous fluid containing a sufficient quantity of a water-soluble thickener, said thickener being stable under reservoir conditions, to increase the viscosity of said aqueous fluid to a value in the range of 10 to 1,500 centipoises, and sufficiently to permit fracturing of said formation, into a confined zone in said input well adjacent to said formation, applying to said aqueous fluid sufficient pressure to fracture said formation, and immediately thereafter injecting said aqueous flooding medium through said input well and into said formation.

2. A method according to claim 1 in which said fracturing fluid contains about 0.1 to 1.0 percent by weight of a water-soluble water-loss additive, and about 1 to 10 pounds of sand per gallon of fracturing fluid.

3. A process according to claim 2 in which said thickener comprises at least one compound selected from the group consisting of alkali metal, ammonium, and substituted ammonium salts of a substituted beta-aminopropionic acid in which a fatty acid radical is a substituent replacing an amino-hydrogen, and the condensation products of coco-fatty acids with diethanolamine.

4. In the production of oil from subterranean reservoirs by the injection of an aqueous flooding medium through an input well, and the recovery of oil through an output well, the improvement comprising the steps of pumping an aqueous fluid containing 0.1 to 1.0 percent by weight of ethylene oxide polymers having molecular weights in the range of 300,000 to 5,000,000 into a confined zone in said input well adjacent to said formation, applying to said aqueous fluid sufficient pressure to fracture said formation, and immediately thereafter injecting said aqueous flooding medium through said input well and into said formation.

5. A method according to claim 4 in which said fracturing fluid includes 0.1 to 1.0 percent by weight of sodium alginate.

6. A method according to claim 5 in which said fracturing fluid contains about 1 to 10 pounds of sand per gallon of fracturing fluid.

References Cited in the file of this patent
UNITED STATES PATENTS

| | | |
|---|---|---|
| 1,237,139 | Yeomans | Aug. 14, 1917 |
| 2,174,027 | Ball | Sept. 26, 1939 |
| 2,862,556 | Tek | Dec. 2, 1958 |
| 2,908,597 | Owen | Oct. 13, 1959 |
| 3,018,826 | Sandiford | Jan. 30, 1962 |

OTHER REFERENCES

"Chemical Additives Improve Fracturing," article by A. W. Coulter in World Oil, Feb. 1, 1957, page 148 of Production Section, page 153 relied on.